3,658,807
CERTAIN AMINO-SUBSTITUTED 5,6 - DIHYDRO - 8H - THIOPYRANO[4',3':4,5]THIENO-[2,3-d]PYRIMIDINES
Paul Schmidt and Kurt Eichenberger, Therwil, and Ernst Schweizer, Basel, Switzerland, assignors to Ciba-Geigy Corporation, Ardsley, N.Y.
No Drawing. Filed Dec. 9, 1970, Ser. No. 96,588
Claims priority, application Switzerland, Dec. 19, 1969, 18,992/69; Nov. 26, 1970, 17,539/70
Int. Cl. C07d 99/06
U.S. Cl. 260—247.1                                    16 Claims

ABSTRACT OF THE DISCLOSURE

Compounds of the formula

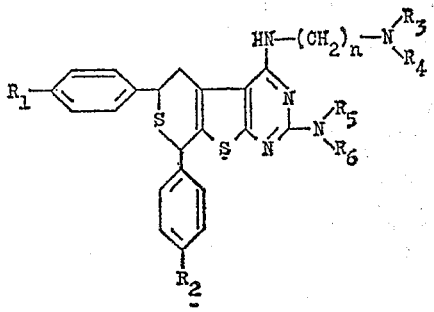

in which $R_1$ and $R_2$ denote halogen atoms or trifluoromethyl groups, $n$ represents 3 or 2, $R_3$ represents hydrogen, ethyl or methyl, $R_4$ represents ethyl or methyl, and $R_5$ and $R_6$ represent hydrogen atoms or lower alkyl residues or together with the nitrogen atom form an optionally C-methylated pyrrolidino, piperidino, hexamethyleneimino, morpholino, thiomorpholino, N'-lower alkylpiperazino or N'-(β-hydroxyethyl)-piperazino residue, are useful as agents against malaria and as anthelmintic agents.

SUMMARY OF THE INVENTION

The present invention relates to new 5,6-dihydro-8H-thiopyrano[4',3':4,5]thieno[2,3-d]pyrimidines. Especially it concerns compounds of the formula

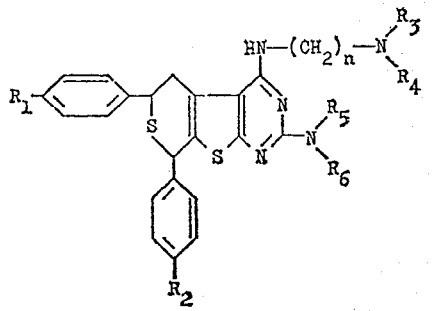

in which $R_1$ and $R_2$ denote halogen atoms, such as bromine atoms, especially fluorine atoms or above all chlorine atoms, or trifluoromethyl groups, $n$ represents 3 or above all 2, $R_3$ represents hydrogen, ethyl or above all methyl, $R_4$ represents ethyl or above all methyl, and $R_5$ and $R_6$ represent hydrogen atoms or lower alkyl residues or together with the nitrogen atom form an optionally C-methylated pyrrolidino, piperidino, hexamethyleneimino, morpholino, thiomorpholino, N'-lower alkylpiperazino or N'-(β-hydroxyethyl)-piperazino residue, and their salts, as well as pharmaceutical compositions containing these compounds and a process for treating malaria or diseases caused by worms consisting in administering such compositions to a warm-blooded being.

Lower alkyl residues are above all those with 1–4 carbon atoms, such as methyl, ethyl, n-propyl, isopropyl, n-butyl, sec.-butyl or isobutyl residues.

The new compounds possess valuable pharmacological properties, above all an antibacterial and antiparasitary action. Thus for example they especially display an action against Plasmodia, for example *Plasmodium berghei*, as is found in animal experiments, for example on oral administration of 4 x 30 to 500 mg./kg. (administered on 4 successive days) to albino mice. The new compounds also act against those strains of Plasmodia which have proved resistant towards other agents against malaria, such as for example Primaquin. The new compounds are therefore useful as chemotherapeutics against malaria (for therapy or prophylaxis). They furthermore possess an action against tape worms, as can for example be shown in animal experiments, for example in mice infected with *Hymenolepis nana*, and can be used as anthelmintics. The new compounds are however also valuable intermediate products for the manufacture of other useful substances, especially of pharmacologically active compounds.

As regards their action against malaria, especially against resistant strains of Plasmodia, the cis-compounds are superior to the trans-compounds.

Compounds of the formula

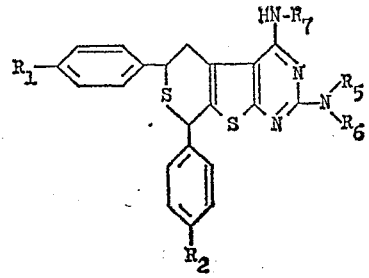

deserve particular emphasis, in which $R_1$ and $R_2$ represent trifluoromethyl groups, bromine atoms or preferably fluorine atoms or above all chlorine atoms, $R_5$ and $R_6$ have the abovementioned significance or, in particular, the residue

represents the amino, methylamino, ethylamino, dimethylamino, diethylamino, pyrrolidino, piperidino, morpholino, 2,6-dimethylthiomorpholino, thiomorpholino, N'-methylpiperazino or N'-(β-hydroxyethyl)-piperazino group and $R_7$ represents the γ-dimethylaminopropyl, β-diethylaminoethyl or above all β-dimethylaminoethyl residue, especially the corresponding cis-compounds.

Compounds to be particularly mentioned because of their action against malaria are those of the formula

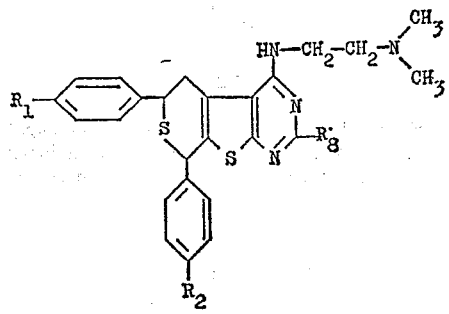

in which $R_1$ and $R_2$ have the indicated significance or especially represent fluorine atoms and/or above all chlorine atoms, and $R_8$ represents the amino, methylamino, ethylamino, dimethylamino, diethylamino, pyrrolidino, piperidino, morpholino, 2,6-dimethylthiomorpholino, thiomorpholino, N'-methylpiperazino or N'-(β-hydroxyethyl)-piperazino group, above all the corresponding cis-compounds and very especially 2-dimethylamino-4-(β-dimethylamino-ethylamino) - 6,8-bis-(p-chlorophenyl)-5,6-dihydro - 8H - thiopyrano[4',3':4,5]thieno[2,3-d]pyrimidine, which for example in the form of its dihydrochloride shows a distinct antimalarial action on albino mice when orally administered on 4 successive days at a dose of 100 mg./kg. in each case, and above all the cis-(2-methyl-amino)-4-(β-dimethylaminoethylamino) - 6,8-bis-(p-chlorophenyl) - 5,6 - dihydro-8H-thiopyrano[4',3':4,5]thieno [2,3-d]pyrimidine, which for example shows a distinct antimalarial action on albino mice when orally administered on 4 successive days at a dose of 100 mg./kg. in each case.

The new compounds are obtained according to methods which are in themselves known.

For example, the procedure followed is that a compound of the formula

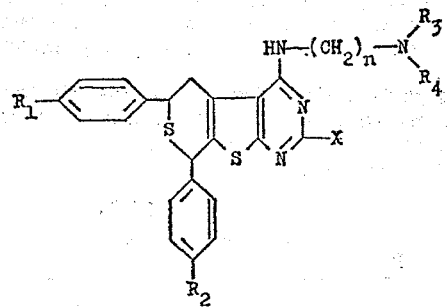

in which $R_1$, $R_2$, $R_3$, $R_4$ and $n$ have the indicated significance and X represents a halogen atom, such as a bromine or especially a chlorine atom, is reacted with an amine of the formula

in which $R_5$ and $R_6$ have the indicated significance. Here the reaction is carried out in the usual manner, appropriately at elevated temperature; if desired, an excess of amine can be used. The reaction can be carried out in the presence or absence of a diluent, optionally in a closed vessel under pressure and/or in an inert gas atmosphere.

The new compounds can also be obtained when a compound of the formula

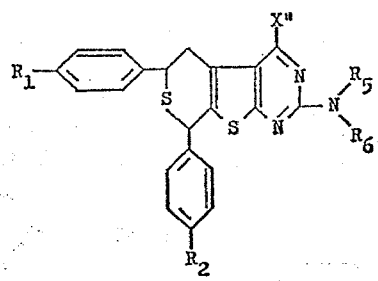

in which $R_1$, $R_2$, $R_5$ and $R_6$ have the indicated significance and X" represents a halogen atom, such as a bromine or especially a chlorine atom, is reacted with an amine of the formula

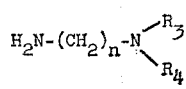

in which $R_3$, $R_4$ and $n$ have the indicated significance. The reaction is carried out in the usual manner, appropriately at elevated temperature; if desired, an excess of amine can be used. The reaction can be carried out in the presence or absence of a diluent, optionally in a closed vessel under pressure and/or in an inert gas atmosphere, advantageously by working under the conditions known in the literature for analogous reactions, for example in quinazoline chemistry.

Depending on the reaction conditions and starting substances, the final substances are obtained in the free form or in the form of their acid addition salts, which are also included in the invention. Thus for example basic, neutral or mixed salts and where appropriate also hemi-hydrates, monohydrates, sesquihydrates or polyhydrates thereof, can be obtained. The acid addition salts of the new compounds can be converted into the free compounds in a manner which is in itself known, for example with basic agents, such as alkalis or ion exchangers. On the other hand the resulting free bases can form salts with organic or inorganic acids. To manufacture acid addition salts, those acids which are suitable for the formation of therapeutically usable salts are especially used. As such acids there may for example be mentioned: hydrohalic acids, sulfuric acid, phosphoric acids, nitric acid, perchloric acid, aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid, embonic acid, methanesulfonic, ethaneslufonic, hydroxyethanesulfonic, ethylenesulfonic acid; halogenobenzenesulfonic, toluenesulfonic, naphthalenesulfonic acid or sulfanilic acid; methionine, tryptophan, lysine or arginine.

These or other salts of the new compounds such as for example the picrates, can also serve for the purification of the resulting free bases, by converting the free bases into salts, separating these off, and again liberating the bases from the salts. Because of the close relationships between the new compounds in the free form and in the form of their salts, what has been said above and hereinafter with reference to the free compounds refers similarly also to the corresponding salts wherever this applies.

The new compounds can, depending on the choice of the starting substances and working methods, be in the form of optical antipodes, racemates or isomer mixtures (racemate mixtures).

Resulting isomer mixtures (racemate mixtures) can be separated into the two stereoisomeric (diastereomeric) pure isomers (racemates) on the basis of the physicochemical differences of the constituents in a known manner, for example by chromatography and/or fractional crystallization.

Resulting racemates can be resolved according to known methods, for example by recrystallization from an optically active solvent, with the aid of micro-organisms, or by reaction with an optically active acid which forms salts with a racemic compound and separation of the salts obtained in this manner, for example on the basis of their different solubilities, into the diastereomers from which the antipodes can be liberated by the action of suitable agents. Particularly customary optically active acids are for example the D- and L-forms of tartaric acid, di-o-toluyltartaric acid, malic acid, mandelic acid, camphorsulfonic acid or quinic acid. Advantageously, the more active of the two antipodes is isolated.

If isomerization occurs during a reaction, the separation can, if desired, be repeated, for example as described above, after the reaction has taken place.

The invention also relates to those embodiments of the process according to which one starts from a compound, obtainable as an intermediate product at any stage of the process and carries out the missing process stages, or in which a starting substance is formed under the reaction conditions, or in which a reaction component is optionally present in the form of an isomer mixture, pure isomer, optical antipode or a salt thereof.

Appropriately, such starting substances are used for carrying out the reactions according to the invention as lead to the initially particularly mentioned groups of final substances and particularly to the final substances which have been especially described or emphasised.

The starting substances are known or can, if they are new, be obtained according to methods which are in themselves known.

In particular, the starting substances can for example be obtained by conversions known in quinazoline chemistry from compounds of the formula

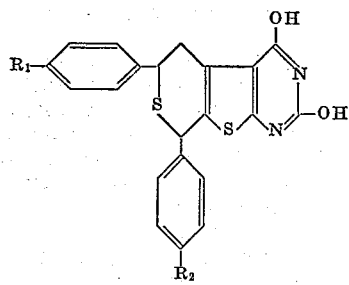

The compounds of the formula

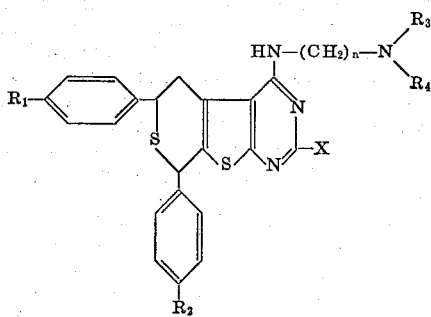

used as preferred starting substances wherein X denotes a halogen atom, especially a bromine atom or above all a chlorine atom, are new and also possess the effects indicated for the final substances, and in particular possess them to a similar order of amgnitude. They can for example be obtained if a compound of the formula

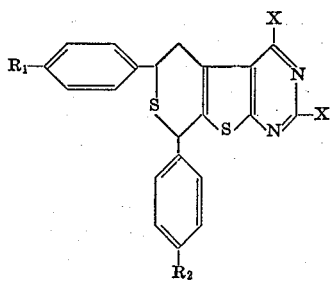

in which X has the indicated significance, is reacted with an amine of the formula

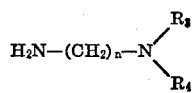

The reaction with the amine takes place in the usual manner, for example as described above.

The 2,4-dihalogen compounds can be obtained in the usual manner, by replacing the two hydroxyl groups in the corresponding 2,4-dihydroxy compounds by halogen atoms. This exchange can for example be carried out in the usual manner, for example by reaction with halides of sulfur or phosphorus, especially phosphorus penta-chloride, phosphorus oxychloride, phosphorus trichloride or the corresponding bromides. The reaction can optionally take place in the presence of a tertiary base, such as triethylamine or dimethylaniline.

The 2,4-dihydroxy compounds can be obtained by reaction of a thiopyranone of the formula

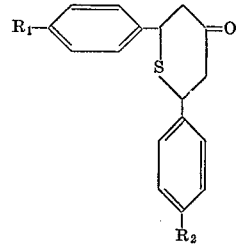

with an N-(cyanoacetyl)-urethane and sulfur.

The new compounds can for example be used in the form of pharmaceutical preparations in which they are present in the free form or in the form of their salts, especially the therapeutically usable salts, mixed with a pharmaceutical, organic or inorganic, solid or liquid excipient which is for example suitable for enteral or parenteral administration. Suitable substances for forming this excipient are those which do not react with the new compounds, such as for example water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations can for example be in the form of tablets, dragées, capsules or suppositories or in a liquid form as solutions (for example as an elixir or syrup), suspensions or emulsions. They are optionally sterilised and/or contain auxiliary substances such as preservatives, stabilisers, wetting agents or emulsifiers, solubilising agents or salts for regulating the osmotic pressure or buffers. They can also contain other therapeutically valuable substances. The pharmaceutical preparations are obtained according to customary methods.

The new compounds can also be used in the form of feedstuffs or of additives to animal fodder. Here the usual extenders and diluents or feedstuffs are for example employed.

The invention is described in more detail in the examples which follow.

EXAMPLE 1

2.75 g. of a mixture of cis- and trans-2-chloro-4-(β-dimethylaminoethylamino) - 6,8-bis-(p-chlorophenyl)-5,6-dihydro - 8H - thiopyrano[4',3':4,5]thieno[2,3-d]pyrimidine are warmed with 74 ml. of a 2.7 N toluene solution of dimethylamine and 100 ml. of absolute toluene to 120° C. for 15 hours in a sealed tube. Thereafter the mixture is evaporated to dryness in vacuo and the residue is triturated with water. A mixture of cis- and trans-2-(dimethylamino) - 4-(β-dimethylaminoethylamino)-6,8-bis-(p - chlorophenyl)-5,6-dihydro-8H-thiopyrano[4',3':4,5] thieno[2,3-d]pyrimidine of the formula

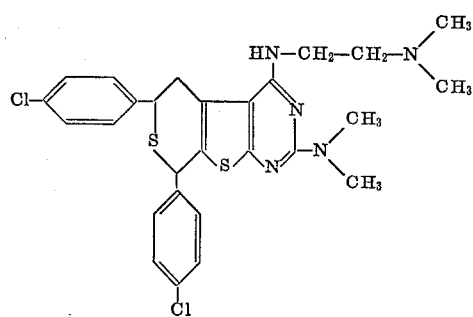

is thus obtained by recrystallisation from a large amount of absolute ethanol, in the form of crystals of melting point 198–200° C.

11 g. of a mixture of cis- and trans-2-(dimethylamino)-4-(β-dimethylaminoethylamino)-6,8-bis-(p-chlorophenyl)-5,6-dihydro-8H-thiopyrano[4',3':4,5]thieno[2,3-d]pyrimidine are suspended hot in 100 ml. of absolute ethanol and dissolved by adding 60 ml. of N-ethanolic hydrochloric acid. After adding 250 ml. of isopropyl ether to the hot solution, the dihydrochloride of the cis-trans mixture of 2-(dimethylamino)-4-(β-dimethylaminoethylamino)-6,8-bis-(p-chlorophenyl)-5,6-dihydro-8H-thiopyrano[4',3':4,5]thieno[2,3-d]pyrimidine precipitates as crystals. It melts at 230° C., with decomposition.

The mixture of cis- and trans-2-chloro-4-(β-dimethylaminoethylamino)-6,8-bis-(p-chlorophenyl)-5,6-dihydro-8H-thiopyrano[4',3':4,5]thieno[2,3-d]pyrimidine used as the starting material can be manufactured as follows:

67.4 g. of 2,6-bis-(p-chlorophenyl)-2,3,5,6-tetrahydro-thiopyran-4-one, 31.2 g. of N-(cyanoacetyl)-urethane, 6.7 g. of powdered sulphur and 20 ml. of morpholine in 300 ml. of absolute ethanol are stirred for 12 hours under nitrogen in a bath at 50° C. The reaction product which has precipitated is filtered off and washed with ethanol. A mixture of the cis- and trans-forms of 2,4-dihydroxy-6,8-bis-(p-chlorophenyl)-5,6-dihydro-8H-thiopyrano[4',3':4,5]thieno[2,3-d]pyrimidene of melting point 190–193° C. is thus obtained.

14 g. of a mixture of cis- and trans-2,4-dihydroxy-6,8-bis-(p-chlorophenyl)-5,6-dihydro-8H-thiopyrano-[4',3':4,5]thieno[2,3-d]pyrimidine and 7.4 g. of N,N-dimethylaniline in 250 ml. of phosphorus oxychloride are warmed for 20 hours in an oil bath at 120° C. Thereafter the excess phosphorus oxychloride is evaporated off in vacuo, the residue is poured into 1 l. of ice water and the mixture is immediately extracted with methylene chloride. The methylene chloride is separated off, dried and concentrated by evaporation in vacuo. The residue is dissolved in a little methylene chloride and chromatographed in a column containing the 60-fold amount of silica gel by elution with methylene chloride. A mixture of cis- and trans-2,4-dichloro-6,8-bis-(p-chlorophenyl)-5,6-dihydro-8H-thiopyrano[4',3':4,5]thieno[2,3-d]pyrimidine is thus obtained as a residue from the methylene chloride solution concentrated by evaporation.

11.6 g. of this residue are dissolved in 400 ml. of absolute toluene and warmed with 6.0 g. of β-dimethylaminoethylamine for 3 hours in an oil bath at 120° C. Thereafter the mixture is evaporated to dryness in vacuo and the residue is crystallised by boiling up in 100 ml. of absolute ethanol. A mixture of the cis- and trans-forms of 2-chloro-4-(β-dimethylaminoethylamino)-6,8-bis-(p-chlorophenyl)-5,6-dihydro-8H-thiopyrano[4',3':4,5]thieno[2,3-d]pyrimidine is thus obtained in white crystals of melting point 197–199° C.

EXAMPLE 2

2.75 g. of trans-2-chloro-4-(β-dimethylaminoethylamino)-6,8-bis-(p-chlorophenyl)-5,6-dihydro-8H-thiopyrano[4',3':4,5]thieno[2,3-d]pyrimidine is heated with 54 ml. of a 1.85 N toluene solution of dimethylamine and 200 ml. of absolute toluene to 120° C. for 15 hours in a sealed tube. The reaction mixture is subsequently evaporated to dryness in vacuo and the residue triturated with water. By extracting the resulting product with absolute ethanol, the trans-2-(dimethylamino)-4-(β-dimethylaminoethylamino)-6,8-bis-(p-chlorophenyl)-5,6-dihydro-8H-thiopyrano[4',3':4,5]thieno[2,3-d]pyrimidine of the formula

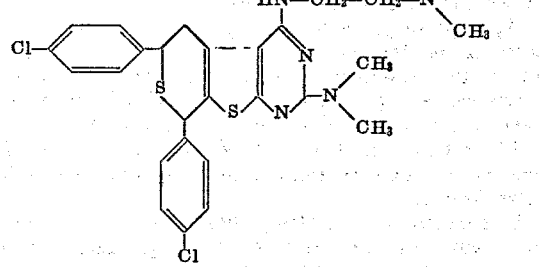

is obtained in the form of crystals which melt at 228–230° C.

9.1 g. of trans-2-(dimethylamino)-4-(β-dimethylaminoethylamino)-6,8-bis-(p-chlorophenyl)-5,6-dihydro-8H-thiopyrano[4',3':4,5]thieno[2,3-d]pyrimidine is suspended hot in 100 ml. of absolute ethanol and dissolved by adding 7.5 ml. of 7 N ethanolic hydrochloric acid. After addition of 80 ml. of isopropylether to the hot solution, the dichloride of the trans-2-(dimethylamino)-4-(β-dimethylaminoethylamino)-6,8-bis-(p-chlorophenyl)-5,6-dihydro-8H-thiopyrano[4',3':4,5]thieno[2,3-d]pyrimidine precipitates in the form of crystals. It melts at 230° C. with decomposition.

The trans-2-chloro-4-(β-dimethylaminoethylamino)-6,8-bis-(p-chlorophenyl)-5,6-dihydro-8H-thiopyrano[4',3':4,5]thieno[2,3-d]pyrimidine used as starting material can be manufactured as follows:

The residue of cis- and trans-2,4-dichloro-6,8-bis-(p-chlorophenyl)-5,6-dihydro-8H-thiopyrano[4',3':4,5]thieno[2,3-d]pyrimidine obtained according to Example 1, is dissolved in 100 ml. of a mixture of toluene+petroleum ether in the ratio 1:1 and poured onto a column with 1000 g. of silica gel. Elution with a mixture of toluene+petroleum ether (1:1) is effected while continuously controlling the resulting fractions by means of thin layer chromatography. By evaporating the corresponding fractions in vacuo, the trans-2,4-dichloro-6,8-bis-(p-chlorophenyl)-5,6-dihydro-8H-thiopyrano[4',3':4,5]thieno[2,3-d]pyrimidine, which is recrystallized from benzene and melts at 206–208° C., is obtained first, and subsequently the cis-2,4-dichloro-6,8-bis-(p-chlorophenyl)-5,6-dihydro-8H-thiopyrano[4',3':4,5]thieno[2,3-d]pyrimidine which melts at 185–187° C. (recrystallized from benzene).

14.9 g. of trans-2,4-dichloro-6,8-bis-(p-chlorophenyl)-5,6-dihydro-8H-thiopyrano[4',3':4,5]thieno[2,3-d]pyrimidine is dissolved, while heating, in 300 ml. of absolute toluene and heated with 5.9 g. of p-dimethylaminoethylamine for 3 hours in an oil bath at 120° C. The reaction mixture is then evaporated to dryness and the residue triturated with water. By extracting the resulting product in 150 ml. of absolute ethanol, the trans-2-chloro-4-(β-dimethylaminoethylamino)-6,8-bis-(p-chlorophenyl)-5,6-dihydro-8H-thiopyrano[4',3':4,5]thieno[2,3-d]pyrimidine of the formula

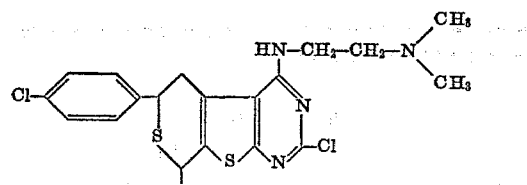

is obtained in the form of white crystals which melt at 207–208° C.

EXAMPLE 3

2.75 g. of cis-2-chloro-4-(β-dimethylaminoethylamino)-6,8 - bis-(p-chlorophenyl) - 5,6-dihydro-8H-thiopyrano[4',3':4,5]thieno[2,3-d]pyrimidine is heated with 44.5 ml. of a 2.7 N toluene solution of dimethylamine and 200 ml. of absolute toluene to 120° C. for 15 hours in a sealed tube. The reaction mixture is subsequently evaporated to dryness in vacuo and the residue is triturated with water. By extracting the resulting product with 70 ml. of absolute ethanol, the cis - 2 - (dimethylamino)-4-(β-dimethylaminoethylamino) - 6,8-bis-(p-chlorophenyl)-5,6-dihydro - 8H-thiopyrano[4',3':4,5] thieno[2,3-d]pyrimidine of the formula

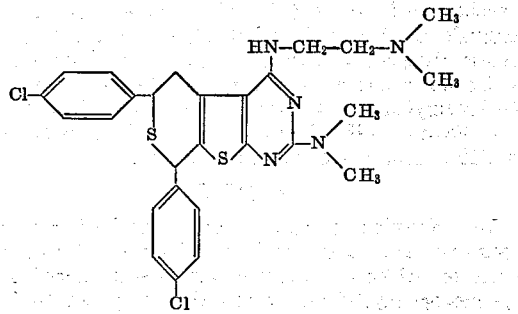

is obtained in the form of crystals, which melt at 223–235° C.

8.6 g. of cis-2-(dimethylamino)-4-(β-dimethylaminoethylamino) - 6,8-bis-(p-chlorophenyl)-5,6-dihydro-8H-thiopyrano[4',3':4,5]thieno[2,3 - d]pyrimidine is suspended hot in 100 ml. of absolute ethanol and dissolved by adding 7 ml. of 7 N ethanolic hydrochloric acid. After 80 ml. of isopropyl ether has been added to the hot solution, the dihydrochloride of the cis-2-(dimethylamino)-4-(β - dimethylaminoethylamino)-6,8-bis-(p-chloro-phenyl-5,6 - dihydro - 8H - thiopyrano[4',3':4,5] thieno[2,3-d]-pyrimidine precipitates in the form of crystals. It melts at 245° C. with decomposition.

The cis - 2-chloro-4-(β-dimethylaminoethylamino)-6,8-bis-(p-chlorophenyl) - 5,6 - dihydro - 8H - thiopyrano[4",3':4,5] thieno[2,3-d]pyrimidine used as starting material can be manufactured as follows:

14.9 g. of cis - 2,4 - dichloro-6,8-bis-(p-chlorophenyl)-5,6 - dihydro - 8H - thiopyrano[4',3':4,5]thieno[2,3-d]-pyrimidine is dissolved, while heating, in 300 ml. of absolute toluene and heated with 5.9 g. of β-dimethylaminoethylamine for 3 hours in an oil bath at 120° C. The reaction mixture is then evaporated to dryness and the residue is triturated with water. By extracting the resulting product in 150 ml. of absolute ethanol, the cis-2-chloro-4-(β-dimethylaminoethylamino) - 6,8 - bis-(p-chlorophenyl)-5,6 - dihydro - 8H - thiopyrano[4',3':4,5]thieno[2,3-d]-pyrimidine of the formula

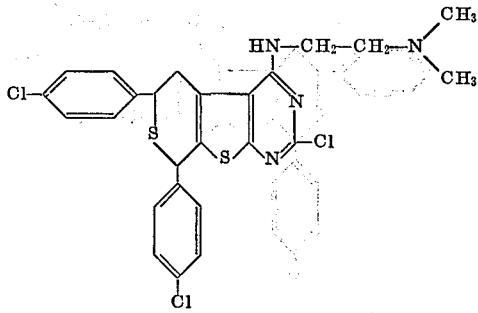

is obtained in the form of white crystals, which melt at 221–222° C.

EXAMPLE 4

2.75 g. of cis-2-chloro-4-(β-dimethylaminoethylamino)-6,8 - bis-(p-chlorophenyl) - 5,6-dihydro-8H-thiopyrano[4',3':4,5]thieno[2,3-d]pyrimidine is heated with 8.5 g. of piperidine and 200 ml. of absolute toluene for 15 hours in an oil bath at 120° C. The reaction mixture is subsequently evaporated to dryness in vacuo and the residue is triturated with water. By extracting the resulting product with absolute ethanol, the cis-2-piperidino-4-(β-dimethylaminoethylamino) - 6,8 - bis-(p-chlorophenyl)-5,6 - dihydro - 8H - thiopyrano[4',3':4,5]thieno[2,3-d]pyrimidine of the formula

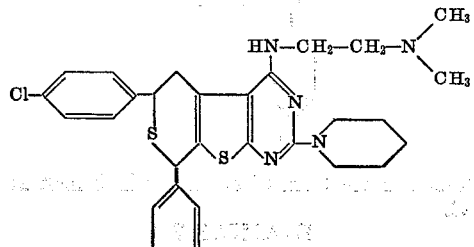

is obtained in the form of crystals, which melt at 255–256° C.

EXAMPLE 5

1.4 g. of cis-2-chloro-4-(β-dimethylaminoethylamino)-6,8-bis(p-chlorophenyl)-5,6-dihydro-8H - thiopyrano[4',3':4,5]thieno[2,3-d]pyrimidine is heated with 4.4 g. of morpholine and 100 ml. of absolute toluene for 15 hours in an oil bath at 120° C. The reaction mixture is subsequently evaporated to dryness in vacuo and the residue is triturated with water. By subsequently extracting the resulting product with absolute ethanol, the cis-2-morpholino-4-(β-dimethylaminoethylamino)-6,8-bis-(p - chlorophenyl)-5,6-dihydro-8H - thiopyrano[4',3':4,5]thieno[2,3-d]pyrimidine of the formula

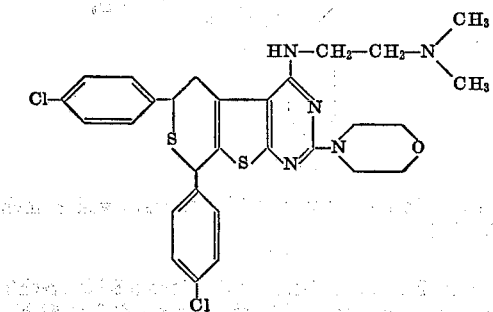

is obtained in the form of crystals, which melt at 231–232° C.

8.8 g. of cis-2-morpholino-4-(β-dimethylaminoethylamino)-6,8-bis-(p-chlorophenyl)-5,6-dihydro - 8H - thiopyrano[4,3':4,5]thieno[2,3-d]pyrimidine is suspended hot in 60 ml. of absolute ethanol and dissolved by adding 50 ml. of N ethanolic hydrochloric acid. After 80 ml. of petroleum ether has been added to the hot solution, the dihydrochloride of the cis-2-morpholino-4-(β-dimetylaminoethylamino)-6,8-bis-(p-chlorophenyl)-5,6 - dihydro-8H-thiopyrano[4',3':4,5]thieno[2,3 - d]pyrimidine precipitates in the form of crystals. It melts at 225° C. with decomposition.

EXAMPLE 6

2.75 g. of cis-2-chloro-4-(β-dimethylaminoethylamino)-6,8-bis-(p-chlorophenyl)-5,6-dihydro-8H - thiopyrano[4',3':4,5]thieno[2,3-d]pyrimidine is heated with 72 ml. of 2.1 N toluene solution of methylamine and 150 ml. of absolute toluene for 20 hours to 120° C. in a sealed tube. The mixture is subsequently evaporated to dryness in vacuo and the residue is triturated with water. By extracting the resulting product with absolute ethanol, the cis-2-(methylamino)-4-(β-dimethylaminoethylamino) - 6,8-bis-(p-chlorophenyl)-5,6-dihydro - 8H - thiopyrano[4', 3':4,5]thieno[2,3-d]pyrimidine of the formula

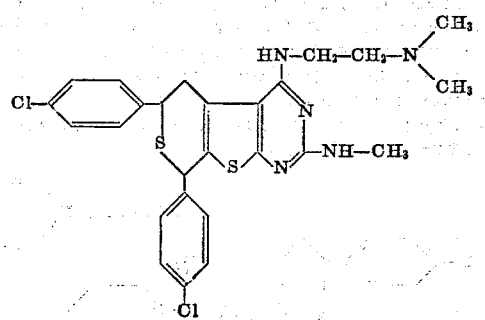

is obtained in the form of crystals, which melt at 245–247° C.

EXAMPLE 7

5.5 g. of trans-2-chloro - 4 - (β - dimethylaminoethylamino-6,8-bis-(p-chlorophenyl)-5,6-dihydro - 8H - thiopyrano[4',3':4,5]thieno[2,3-d]pyrimidine is heated with 150 ml. of a toluene solution containing 0.3 mol of methylamine and 150 ml. of toluene for 20 hours to 120° C. in a sealed tube. The reaction solution is extracted twice with water and the toluene solution dried and evaporated. The residue is extracted with 100 ml. of absolute ethanol and the insoluble portion filtered off. The trans-2-(methylamino)-4-(β-dimethylaminoethylamino) - 6,8 - bis - (p-chlorophenyl)-5,6 - dihydro - 8H - thiopyrano[4',3':4,5]thieno[2,3-d]pyrimidine of the formula

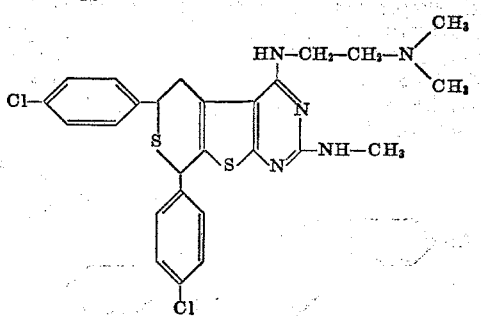

is obtained in the form of white crystals, which melt at 216–218° C.

EXAMPLE 8

2.5 g. of 2-(dimethylamino)-4-chloro-6,8-bis-(p-chlorophenyl) - 5,6 - dihydro - 8H - thiopyrano[4',3':4,5]thieno-[2,3-d]pyrimidine (cis-trans mixture) is dissolved in 100 ml. of absolute toluene and refluxed with 1.76 g. of β-dimethylaminoethylamine for 3 hours while stirring. The reaction mixture is subsequently evaporated to dryness in vacuo and the residue triturated with water. By recrystallization from ethanol, the 2-(dimethylamino)-4-(β-dimethylaminoethylamino) - 6,8 - bis-(p-chlorophenyl)-5,6-dihydro - 8H - thiopyrano[4',3':4,5]thieno[2,3 - d]pyrimidine of the formula

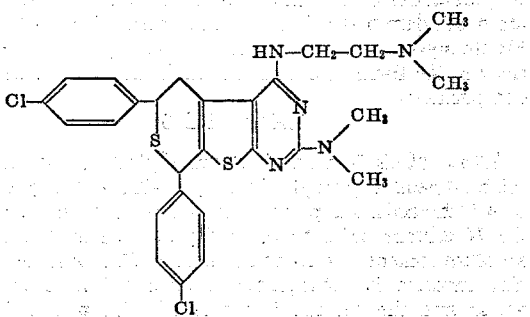

is obtained in the form of white crystals, which melt at 198–200° C.

The 2 - (dimethylamino)-4-chloro - 6,8 - bis-(p-chlorophenyl) - 5,6 - dihydro - 8H - thiopyrano[4',3':4,5]thieno-[2,3-d]pyrimidine used as starting material can be prepared, for example, as follows:

5 g. of 2,4-dichloro-6,8-bis-(p-chlorophenyl)-5,6-dihydro - 8H - thiopyrano[4',3':4,5]thieno[2,3-d]pyrimidine in 75 ml. of 0.2 N sodium hydroxide solution is refluxed, while stirring. The 2-chloro-4-hydroxy-6,8-bis-(p-chlorophenyl) - 5,6 - dihydro - 2H - thiopyrano[4',3':4,5]thieno-[2,3-d]pyrimidine is thus obtained. This product is heated in a toluene solution containing an excess of dimethylamine for 15 hours to 120° C. in a sealed tube. The resulting 2-(dimethylamino)-4-hydroxy - 6,8 - bis-(p-chlorophenyl) - 5,6 - dihydro - 8H - thiopyrano[4',3':4,5]thieno-[2,3-d]pyrimidine in 20 parts by volume of phosphorous oxychloride is refluxed for 15 hours with addition of 2 equivalents of N,N-dimethylaniline. By evaporating the excess phosphorous oxychloride, decomposing the residue in ice water and extraction with methylene chloride, the 2-(dimethylamino)-4-chloro - 6,8 - bis - (p-chlorophenyl)-5,6 - dihydro - 8H - thiopyrano[4',3':4,5]thieno[2,3-d]pyrimidine (cis-trans mixture) is obtained.

EXAMPLE 9

The following compounds can be obtained in an analogous manner to that described in Examples 1 to 7, by reaction of 2-chloro-4-(β-dimethylaminoethylamino)-6,8-bis-(p-chlorophenyl)-5,6-dihydro - 8H - thiopyrano[4',3':4,5]thieno[2,3-d]pyrimidine with diethylamine, piperidine, morpholine and ammonia:

(a) cis- or trans-2-diethylamino-4-(β-dimethylaminoethylamino) - 6,8 - bis - (p-chlorophenyl)-5,6-dihydro-8H-thiopyrano[4',3':4,5]thieno[2,3-d]pyrimidine, (b) trans - 2 - piperidino-4-(β-dimethylaminoethylamino)-6,8-bis-(p-chlorophenyl)-5,6 - dihydro-8H-thiopyrano[4',3':4,5]thieno[2,3-d]pyrimidine, (c) trans - 2 - morpholino-4-(β-dimethylaminoethylamino)-6,8 - bis-(p-chlorophenyl)-5,6-dihydro-8H-thiopyrano[4',3':4,5]thieno[2,3-d]pyrimidine, and (d) cis- or trans-2-amino-4-(β-dimethylaminoethylamino)-6,8-bis-(p-chlorophenyl)-5,6-dihydro-8H - thiopyrano[4',3':4,5]thieno[2,3-d]pyrimidine.

EXAMPLE 10

Trans - 2 - chloro-4-(β-dimethylaminoethylamino)-6,8-bis - (p - fluorophenyl) - 5,6 - dihydro - 8H - thiopyrano-[4',3':4,5]thieno[2,3-d]pyrimidine (2.7 g.) is heated for 20 hours in a sealed tube with 40 ml. of a 3.8 N toluolic methylamine solution and 150 ml. of absolute toluene. The reaction mixture is thereafter evaporated to dryness and the residue triturated with water. By extracting the resulting product with 50 ml. of absolute ethanol, the trans-2-methylamino - 4-(β-dimethylaminoethylamino)-6,8-bis-(p-fluorophenyl)-5,6-dihydro - 8H - thiopyrano[4',3':4,5]thieno[2,3-d]pyrimidine of formula

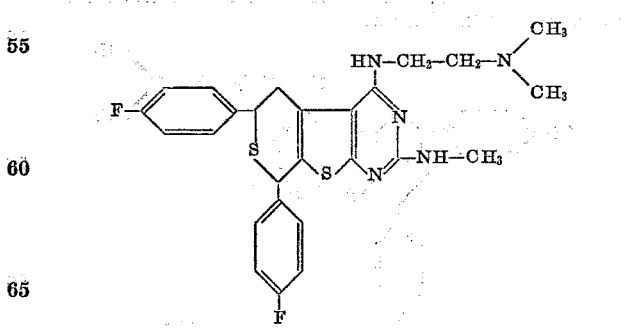

is obtained in the form of pure crystals that melt at 223–225° C.

Trans - 2 - methylamino - 4-(β-dimethylaminoethylamino)-6,8-bis-(p-fluorophenyl)-5,6-dihydro-8H - thiopyrano-[4',3':4,5]thieno[2,3-d]pyrimidine (6.2 g.) is suspended hot in 50 ml. of absolute ethanol and dissolved by addition of 4.3 ml. of a 7 N ethanolic hydrochloric acid. After addition of 150 ml. of isopropylether to the hot solution, the crystalline dihydrochloride of the trans-2-methylamino - 4 - (β-dimethylaminoethylamino) - 6,8 - bis-(p-fluorophenyl) - 5,6 - dihydro - 8H - thiopyrano[4',3':4,5]thieno-[2,3-d]pyrimidine settles out. It melts with decomposition at 250–253° C.

The trans-2-chloro-4-(β-dimethylaminoethylamino)-6,8-bis-(p-fluorophenyl)5,6 - dihydro-8H-thiopyrano[4',3':4,5] thieno[2,3-d]pyrimidine used as starting material can be manufactured as follows:

A mixture of p-fluorobenzaldehyde (124 g.) and acetone (29 g.) is added in increments to a solution of sodium hydroxide (100 g.) in 1.6 ml. of 40% strength ethanol while stirring. After one hour further stirring, the precipitated reaction product is filtered with suction and washed with water until neutral. By recrystallization from ethyl acetate, the 1,5-bis-(p-fluorophenyl)-1,4-pentadien-3-one is obtained that melts at 155–157° C.

A weak stream of hydrogen sulfide gas is passed for 6 hours and while boiling through a suspension of 1,5-bis-(p-fluorophenyl)-1,4-pentadien-3-one (79 g.) and anhydrous sodium acetate (80 g.) in 2 l. of 90% strength ethanol. Thereafter 2 l. of water are added in increments while slowly cooling, in the process of which a solid precipitate gradually forms that, after the mixture has been further stirred for 6 hours at ambinet temperature, is filtered with suction and washed with 50% strength ethanol. By recrystallization from absolute ehanol, the 2,6-bis-(p-fluorophenyl)-2,3,5,6-tetrahydro-thiopyran-4-one is obtained that melts at 124–126° C.

Bis-(p-fluorophenyl) - 2,3,5,6 - tetrahydro-thiopyran-3-one (102 g.), N-(cyanoethyl)-urethane (52.5 g.), pulverised sulfur (11.8 g.) and 33 ml. of morpholine are stirred for 9 hours under nitrogen in 660 ml. of absolute ethanol in a bath of 50° C. The precipitated reaction product is filtered with suction and washed with ethanol. A mixture of the cis- and trans-forms of 2,4-dihydroxy-6,8-bis-(p-fluorophenyl) - 5,6 - dihydro - 8H-thiopyrano[4',3':4,5]thieno[2,3-d]pyrimidine is thus obtained that melts at 200–203° C.

A mixture of cis- and trans-2,4-dihydroxy-6,8-bis-(p-fluorophenyl) - 5,6 - dihydro - 8H - thiopyrano[4',3':4,5] thieno [2,3-d]pyrimidine (49.4 g.) and N,N-dimethylaniline (28 g.) are heated in 1 liter of phosphorous oxychloride for 20 hours in an oil bath of 120° C. The excess phosphorous oxychloride is thereafter evaporated in vacuo and the residue dissolved in 1.5 l. of methylene chloride. The methylene chloride solution is extracted by shaking with ice-water, dried, and evaporated in vacuo. The residue is dissolved in a small amount of methylene chloride, poured onto a column with 50 times its weight of silica gel and chromatographed by elution with methylene chloride. From the evaporated methylene chloride is obtained as residue a mixture of cis- and trans-2,4-dichloro-6,8-bis-(p-fluorophenyl)-5,6-dihydro - 8H - thiopyrano [4',3':4,5]thieno[2,3-d]pyrimidine.

This residue (18 g.) is dissolved in 200 ml. of a mixture of toluene+petroleum ether 4:1 and poured onto a chromatographic column with 2.3 kg. of silica gel. Elution is carried out with a mixture of toluene+petroleum ether 4:1 while exercising continuous control of the resulting fractions by means of thin-layer chromatography. By evaporating the corresponding fractions, trans-2,4-dichloro-6,8-bis-(p-fluorophenyl) - 5,6 - dihydro - 8H - thiopyrano[4',3':4,5]thieno[2,3-d]pyrimidine is obtained initially which, after recrystallization from benzene-petroleum ether, melts at 175–176° C., and thereafter cis-2,4-dichloro-6,8-bis(p-fluorophenyl)-5,6-dihydro - 8H - thiopyrano[4',3':4,5]thieno[2,3-d]pyrimidine which, after recrystallization from isopropyl-ether, melts at 184–185° C.

Trans - 2,4 - dichloro-6,8-bis-(p-fluorophenyl)-5,6-dihydro - 8H - thiopyrano[4',3':4,5]thieno[2,3-d]pyrimidine (4.65 g.) is dissolved in 150 ml. of absolute toluene while heating and heated with β-dimethylaminoethylamine (1.95 g.) for 3 hours in an oil bath of 120° C. The reaction mixture is evaporated in vacuo to dryness and the residue triturated with water. By extracting the resulting product with 30 ml. of absolute ethanol, the trans-2-chloro-4-(β-dimethylaminoethylamino)-6,8-bis-(p-fluorophenyl) - 5,6-dihydro - 8H - thiopyrano[4',3':4,5]thieno[2,3-d]pyrimidine of formula

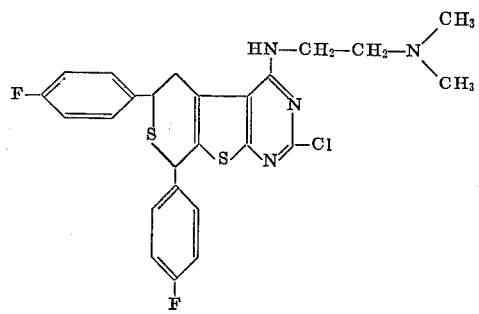

is obtained in the form of white crystals that melt at 212–214°C.

EXAMPLE 11

Cis - 2 - chloro-4-(β-dimethylaminoethylamino)-6,8-bis-(p-fluorophenyl) - 5,6 - dihydro-8H-thiopyrano[4',3':4,5]thieno[2,3-d]pyrimidine (4.0 g.) is heated for 20 hours in a sealed tube with 60 ml. of a 3.8 N toluolic methylamine solution and 250 ml. of absolute toluene. The reaction mixture is thereafter evaporated to dryness and the residue triturated with water. By extracting the resulting product with 70 ml. of absolute ethanol, the cis-2-methylamino - 4 - (β - dimethylaminoethylamino)-6,8-bis-(p-fluorophenyl) - 5,6 - dihydro-8H-thiopyrano[4',3':4,5]thieno[2,3-d]pyrimidine of formula

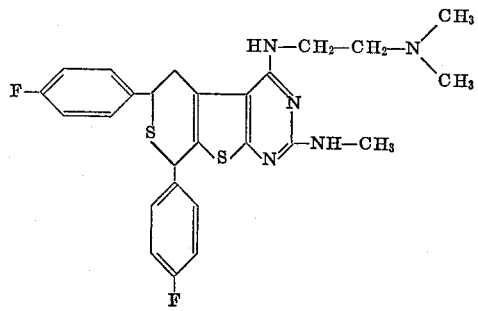

is obtained in the form of white crystals that melt at 226–228° C.

Cis - 2 - methylamino-4-(β-dimethylaminoethylamino)-6,8 - bis - (p - fluorophenyl)-5,6-dihydro-8H-thiopyrano-[4',3':4,5]thieno[2,3-d]pyrimidine (5.5 g.) is suspended hot in 50 ml. of absolute ethanol and dissolved by addition of 3.9 ml. of a 7 N ethanolic hydrochloric acid. After addition of 150 ml. of isopropylether to the hot solution, the crystalline dihydrochloride of cis-2-methylamino-4-(β - dimethylaminoethylamino)-6,8-bis-(p-fluorophenyl)-5,6-dihydro-8H-thiopyrano[4',3':4,5]thieno[2,3-d]pyrimidine settles out. It melts with decomposition at 212–215° C.

The cis-2-chloro-4-(β-dimethylaminoethylamino) - 6,8-bis - (p - fluorophenyl)-5,6-dihydro-8H-thiopyrano[4',3': 4,5]thieno[2,3-d]pyrimidine used as starting material can be manufactured as follows:

Cis - 2,4 - dichloro - 6,8 - bis-(p-fluorophenyl)-5,6-dihydro - 8H - thiopyrano[4',3':4,5]thieno[2,3 - d]pyrimidine (7.3 g.) is dissolved in 200 ml. of absolute toluene while heating and heated with β-dimethylaminoethylamine (3.1 g.) for 3 hours in an oil bath of 120° C. The reaction mixture is thereafter evaporated to dryness in vacuo and the residue triturated with water. By extracting the resulting product with 50 ml. of absolute ethanol, the cis-2-chloro - 4 - (β - dimethylaminoethylamino)-6,8-bis-(p-fluorophenyl) - 5,6-dihydro-8H-thiopyrano[4',3':4,5]thieno[2,3-d]pyrimidine of formula

15

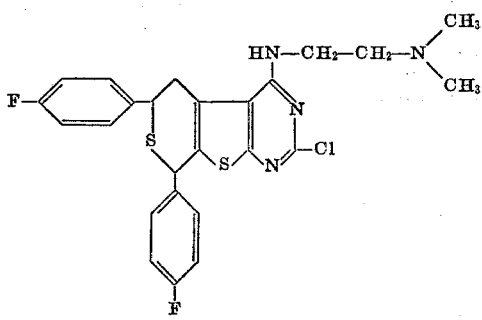

is obtained in the form of white crystals that melt at 205–206° C.

EXAMPLE 12

Tablets containing 100 mg. of active substance can for example be manufactured with the following composition:

Composition: Per tablet, mg.
2 - (dimethylamino) - 4 - ($\beta$ - dimethylamino-
 ethylamino) - 6,8 - bis - (p - chlorophenyl)-
 5,6 - dihydro-8H-thiopyrano[4',3':4,5]-thieno-
 [2,3-d]pyrimidine dihydrochloride _____ 100
Lactose _____ 50
Wheat starch _____ 74
Colloidal silica _____ 13
Talc _____ 12
Magnesium stearate _____ 1
                                              ___
                                              250

Manufacture

The 2 - (dimethylamino) - 4 - ($\beta$ - dimethylamino-ethylaminoethylamino) - 6,8 - bis - (p - chlorophenyl-5,6 - dihydro - 8H - thiopyrano[4',3':4,5]thieno[2,3-d] pyrimidine dihydrochloride is mixed with the lactose, a part of the wheat starch and with colloidal silica and the mixture is forced through a seive. A further part of the wheat starch is glutenised with a 5-fold amount of water on a waterbath and the powder mixture is kneaded with this gluten until a weakly plastic mass has been produced. The plastic mass is forced through a sieve of about 3 mm. mesh width, dried, and the dry granules again forced through a seive. Thereafter the remaining wheat starch, talc and magnesium stearate are mixed in and the resulting mixture is pressed into tablets weighing 250 mg. (having a breaking notch).

EXAMPLE 13

Tablets containing 10 mg. of active substance can for example be manufactured with the following composition:

Composition: Per tablet, mg.
2 - (methylamino) - 4 - ($\beta$- dimethylamino-
 ethylamino) - 6,8 - bis - (p - chlorophenyl)-
 5,6 - dihydro - 8H - thiopyrano[4',3':4,5]-
 thieno[2,3-d]pyrimidine dihydrochloride __ 10.0
Wheat starch _____ 29.5
Lactose _____ 50.0
Colloidal silica _____ 5.0
Talc _____ 5.0
Magnesium stearate _____ 0.5
                                              _____
                                              100.0

Manufacture

The 2 - (methylamino) - 4 - ($\beta$ - dimethylaminoethyl-amino)-6,8-bis-(p - chlorophenyl - 5,6 - dihydro-8H-thiopyrano[4',3':4,5]thieno[2,3 - d]pyrimidine dihydrochloride is mixed with a part of the wheat starch, with lactose and with colloidal silica and the mixture is forced through a seive. A further part of the wheat starch is glutenised on a water-bath with a 5-fold amount of water and the powder mixture is kneaded with this gluten until a weakly plastic mass has been produced. The

16 plastic mass is forced through a seive of about 3 mm. mesh width and dried and the dry granules are again forced through a seive. Thereafter the remaining wheat starch, talc and magnesium stearate are mixed in and the resulting mixture is pressed into tablets weighing 100 mg.

We claim:

1. A member selected from the group consisting of a compound of the formula

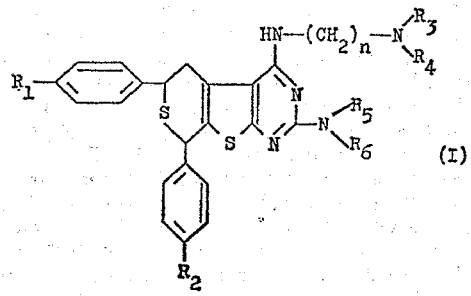

in which $R_1$ and $R_2$ each represents a member selected from the group consisting of halogen and trifluoromethyl, $n$ represents an integer from 2 to 3, $R_3$ represents a member selected from the group consisting of hydrogen, ethyl and methyl, $R_4$ a member selected from the group consisting of ethyl and methyl, and $R_5$ and $R_6$ each represents a member selected from the group consisting of hydrogen, lower alkyl and when taken together with the nitrogen atom pyrrolidino, piperidino, hexamethyleneimino, morpholino, thiomorpholino, N'-lower alkyl-piperazino, $N_2$ - ($\beta$ - hydroxyethyl) - piperazino, C-methylated pyrrolidino, C-methylated piperidino, C-methylated hexamethyleneimino, C-methylated morpholino, C-methylated thiomorpholino, C-methylated N'-lower alkylpiperazino and C-methylated N'-($\beta$ - hydroxyethyl)-piperazino, and their salts.

2. A product as claimed in claim 1, in which $R_1$ and $R_2$ each represents a member selected from the group consisting of trifluoromethyl, bromine, fluorine and chlorine, and the group of the formula $$\text{HN}-(\text{CH}_2)_n-\text{N} \overset{R_3}{\underset{R_4}{\diagdown}}$$

represents a member selected from the group consisting of $\gamma$-dimethylaminopropyl, $\beta$-diethylaminoethyl and $\beta$-dimethylaminoethyl.

3. A product as claimed in claim 1, in which $R_1$ and $R_2$ each represents a member selected from the group consisting of fluorine and chlorine, $$-\text{N} \overset{R_5}{\underset{R_6}{\diagdown}}$$

represents a member selected from the group consisting of amino, methylamino, ethylamino, dimethylamino, diethylamino, pyrrolidino, piperidino, morpholino, 2,6-dimethylthiomorpholino, thiomorpholino, N'-methylpiperazino and N' - ($\beta$ - hydroxyethyl) - piperazino, $n$ stands for 2 and $R_3$ and $R_4$ each stand for methyl.

4. A product as claimed in claim 1, which product is 2 - dimethylamino - 4 - ($\beta$-dimethylaminoethylamino)-6,8 - bis - (p - chlorophenyl) - 5,6 - dihydro - 8H-thiopyrano[4',3':4,5]thieno[2,3 - d]pyrimidine or a salt thereof.

5. A product as claimed in claim 1, which product is 2 - diethylamino - 4 - ($\beta$ - dimethylaminoethylamino)-6,8 - bis - (p - chlorophenyl) - 5,6 - dihydro - 8H - thiopyrano[4',3':4,5]thieno[2,3 - di]pyrimidine or a salt thereof.

6. A product as claimed in claim 1, which product is 2 - piperidino - 4 - ($\beta$ - dimethylaminoethylamino)-6,8- bis-(p-chlorophenyl) - 5,6 - dihydro - 8H - thiopyrano-[4′,3′:4,5]thieno[2,3 - d]pyrimidine or a salt thereof.

7. A product as claimed in claim 1, which product is 2 - morpholino - 4 - (β - dimethylaminoethylamino)-6,8-bis-(p-chlorophenyl) - 5,6 - dihydro - 8H - triopyrano[4′,3′:4,5]thieno[2,3-d]pyrimidine or a salt thereof.

8. A product as claimed in claim 1 which product is 2 - amino - 4 - (β - dimethylaminoethylamino)-6,8-bis-(p-chlorophenyl) - 5,6 - dihydro - 8H - thiopyrano[4′,3′:4,5]thieno[2,3-d]pyrimidine or a salt thereof.

9. A product as claimed in claim 1 which product is 2 - methylamino - 4 - (β - dimethylaminoethylamino)-6,8-bis - (p - chlorophenyl) - 5,6 - dihydro - 8H - thiopyrano[4′,3′:4,5]thieno[2,3 - d]pyrimidine or a salt thereof.

10. A product as claimed in claim 9 in the cis-form.

11. A product as claimed in claim 9 in the trans-form.

12. A product as claimed in claim 1 which product is 2-methylamino - 4 - (β-dimethylaminoethylamino)-6,8-bis-(p-fluorophenyl) - 5,6 - dihydro - 8H - thiopyrano[4′,3′:4,5]thieno[2,3 - d]pyrimidine or as a salt thereof.

13. A member selected from the group consisting of compounds of the formula

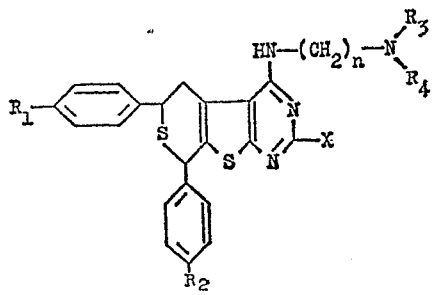

in which $R_1$ and $R_2$ each stands for a member selected from the group consisting of halogen and trifluoromethyl, $n$ for an integer from 2 to 3, $R_3$ represents a member selected from the group consisting of hydrogen, ethyl and methyl, $R_4$ represents a member selected from the group consisting of ethyl and methyl and X stands for a halogen atom and their salts.

14. A product as claimed in claim 13, in which $n$ stands for 2 and $R_3$ and $R_4$ each for methyl.

15. A product as claimed in claim 13, which product is 2 - chloro - 4 - (β - dimethylaminoethylamino)-6,8-bis-(p-chlorophenyl) - 5,6 - dihydro - 8H - thiopyrano[4′,3′:4,5]thieno[2,3-d]pyrimidine or a salt thereof.

16. A product as claimed in claim 13, which product is 2 - chloro - 4 - (β - dimethylaminoethylamino) - 6,8-bis - (p - fluorophenyl) - 5,6 - dihydro - 8H - thiopyrano[4′,3′:4,6]thieno[2,3-d]pyrimidine or a salt thereof.

References Cited
UNITED STATES PATENTS
3,470,183   9/1969   Roth _____ 260—256.5

ALEX MAZEL, Primary Examiner
R. J. GALLAGHER, Assistant Examiner

U.S. Cl. X.R.
260—243 B, 251 A, 256.5 R, 327 R; 424—200, 232, 246, 248, 251

PO-1050
(5/69)

UNITED STATES PATENT OFFICE
CERTIFICATE OF CORRECTION

Patent No. 3,658,807      Dated April 25, 1972

Inventor(s) PAUL SCHMIDT ET AL

It is certified that error appears in the above-identified patent and that said Letters Patent are hereby corrected as shown below:

Column 16, line 34, claim 1, delete "$N_2$", and substitute --- $N'$ ---.

Column 17, line 21, claim 12, delete "as".

Column 18, line 17, claim 16, delete "[4',3':4,6]", and substitute --- [4',3':4,5] ---.

Signed and sealed this 13th day of February 1973.

(SEAL)
Attest:

EDWARD M. FLETCHER, JR.
Attesting Officer

ROBERT GOTTSCHALK
Commissioner of Patents jac